June 22, 1954  B. W. LANYON  2,681,959
MASTER CYLINDER SIGNAL DEVICE
Filed Feb. 1, 1952

Burton W. Lanyon
INVENTOR.

BY *Clarence A. O'Brien*
*and Harvey B. Jacobson*
Attorneys

Patented June 22, 1954

2,681,959

UNITED STATES PATENT OFFICE 2,681,959

MASTER CYLINDER SIGNAL DEVICE

Burton W. Lanyon, Malvern, Ark.

Application February 1, 1952, Serial No. 269,419

2 Claims. (Cl. 200—84)

This invention relates in general to signal devices, and more particularly to a signal device for indicating the oil level within the reservoir of a master brake cylinder.

The frequent cause of many automobile accidents may often be traced to the fact that one of the colliding vehicles has defective brakes due to the lack of hydraulic brake fluid within the reservoir of the master brake cylinder. Since it is difficult to determine whether the brakeshoes need adjusting or the level of the hydraulic brake fluid is low within the reservoir of the master brake cylinder when the brake pedal approaches the floor board when the brakes are applied, the average driver does not realize that the reservoir of the master brake cylinder is almost empty, due to small unknown leaks in the brake lines of the ordinary hydraulic brake cylinder of an automobile. There is oftentimes a slow loss of hydraulic brake fluid until one day there is insufficient brake fluid within the reservoir to actuate the brakes.

The primary object of this invention is to provide an improved signal device which may be attached to any conventional master brake cylinder whereby the driver of a vehicle may be warned when the level of the hydraulic brake fluid within the reservoir of the master brake cylinder has reached a dangerously low level.

Another object of this invention is to provide an improved signal device for attachment to a master brake cylinder, said signal device including a switch carried by the master brake cylinder.

Another object of this invention is to provide an improved switch means for actuating signal devices to indicate a dangerously low level of hydraulic brake fluid within the reservoir of a master brake cylinder, said switch means including a movable contact and a fixed contact.

Another object of this invention is to provide an improved switch means for attachment to a master brake cylinder which is of simple and compact construction whereby it may be economically manufactured.

Another object of this invention is to provide an improved switch means for attachment to a master brake cylinder, said switch means being of such construction whereby it may be easily adapted to a conventional master brake cylinder mounted on the vehicle to which the signal is to be attached.

A further object of this invention is to provide an improved switch mechanism for attachment to a master brake cylinder, said switch mechanism including a movable arm actuated by a float within the reservoir of a master brake cylinder and a fixed contact in the form of a band around the exterior of the master brake cylinder.

With these objects definitely in view, this invention resides in certain novel featuers of construction, combination and arrangement of elements and of portions as will be hereinafter described in detail in the specification, particularly pointed out in the appended claims, and illustrated in the accompanying drawings which form a material part of this application, and in which:

Similar characters of reference designate similar or identical elements and portions throughout the specification and throughout the different views of the drawings.

Figure 1:
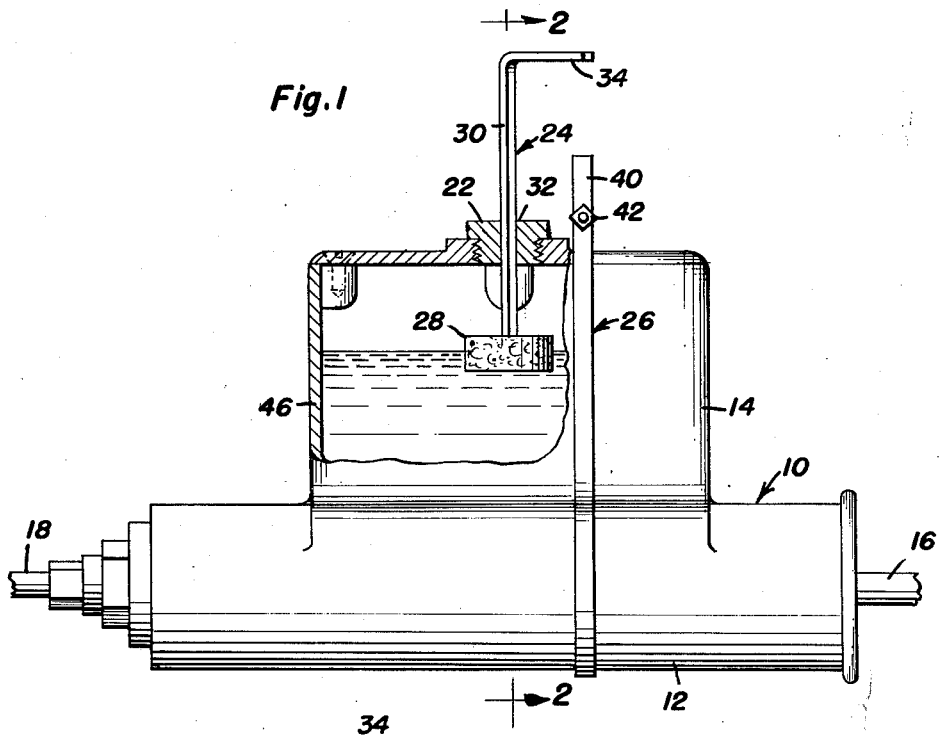
Figure 1 is a side elevational view of a conventional master brake cylinder, a portion of the reservoir of the cylinder being broken away and shown in section in order to clearly illustrate the construction and arrangement of a movable contact.
Figure 2:
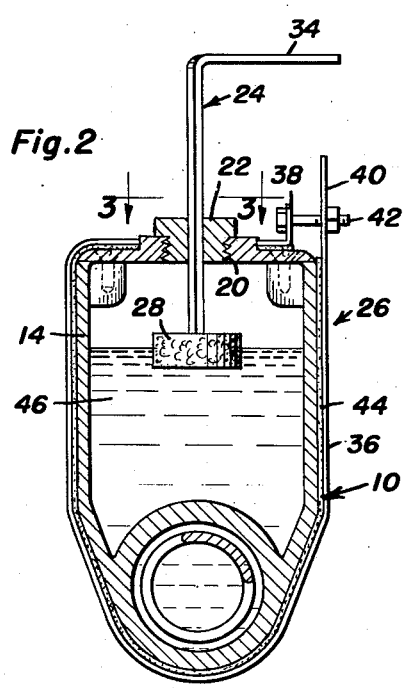
Figure 2 is a transverse vertical sectional view taken substantially upon the plane indicated by the section line 2—2 of Figure 1 and showing the relationship of the movable and fixed contacts with respect to the master brake cylinder.
Figure 3:
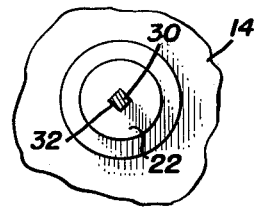
Figure 3 is a partial transverse horizontal sectional view taken substantially upon the plane indicated by the section line 3—3 of Figure 2 and showing the shape of a float rod and an opening through which it passes.

Referring now to the drawings in detail, it will be seen that there is illustrated a conventional master brake cylinder which will be referred to in general by the reference numeral 10. The master brake cylinder 10 is provided with an elongated cylinder portion 12 and a reservoir 14. The cylinder portion 12 is provided with an actuating rod 16 extending from one end and a hydraulic brake line 18 extending from the opposite end. The reservoir 14 is hollow with its upper side provided with a threaded filler opening 20 which is closed by a filler cap 22.

The switch mechanism carried by the master brake cylinder 10 includes a movable contact referred to generally by the reference numeral 24 and a fixed contact referred to generally by the reference numeral 26.

The movable contact 24 includes a float 28 which may be formed of cork, neoprene, hollow metal, or any other suitable material which is resistant to damage by hydraulic brake fluid. The float 28 is carried at the lower end of a float rod 30 which extends to an opening 32 in the filler cap 22. Carried at the upper end of the float rod 30 is a flat arm 34 which forms the movable contact of the switch. The fixed contact 26 is in the form of a band 36 around the master brake cylinder. The band 36 has an upstanding flange 38 in parallel relation to an arm 40 at the ends of the band 36. The flange 38 and the arm 40 are secured together by a bolt 42 so as to clamp the band 36 around the master brake cylinder 10. The band 36 is insulated from the master brake cylinder by a strip of insulating material 44.

The float rod 30 is rectangular in cross-section as is the opening 32 so that the arm 34 may be positioned in alignment with the arm 40. When the level of the hydraulic fluid 46 within the reservoir 14 drops, the float 28 and the arm 34 also drop until the arm 34 comes into engagement with the upper end of the arm 40.

Figure 4:
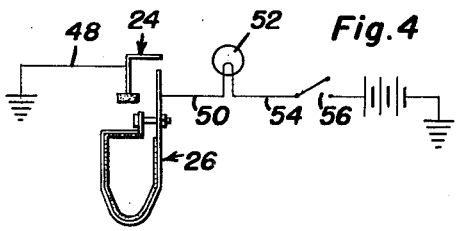
Figure 4 is a schematic wiring diagram showing the manner in which the switch means carried by the master brake cylinder is connected in a power supply line to an indicating bulb.

Referring now to the circuit diagram of Figure 4, it will be seen that it is intended that a wire 48 extends from the movable contact 24 to the ground. However, since the master brake cylinder 10 and the movable contact 24 are formed of metal and are rigidly secured to the frame of an automobile which is the ground in the wiring system of the automobile, it may not be necessary to use a wire 48. A second wire 50 is connected to the arm 40 of the fixed contact 26 and extends to a signal light 52 to which its other end is connected. The light 52 is mounted in any suitable position on the dashboard of an automobile to which the indicating signal is attached. Extending from the lamp 52 to the ignition switch of the automobile is a wire 54. The ignition switch is generally referred to by the reference numeral 56. The ignition switch 56 is connected to a battery which is grounded on one terminal by the conventional wiring of an automobile. It will be noted that the bulb 52 is connected through the ignition switch 56 so that the bulb 52 will be lit only when the automobile is being driven.

The operation of this signal device will be understood from the foregoing description of the mechanical details thereof, taken in connection with the above recited objects and the drawings. A further description would appear to be unnecessary.

Minor modifications of the signal device, varying in minor details from the embodiment of the signal device illustrated and described here, may be resorted to without departure from the spirit and scope of this invention, as defined in the appended claims.

Having described the invention, what is claimed as new is:

1. A float operated switch for indicating the oil level in a master brake cylinder, said switch including a movable contact actuated by float means, a fixed contact carried by said brake cylinder, said fixed contact being in the form of a band clamped around said master brake cylinder, said band having spaced ends urged towards each other by a fastener, one of said ends forming an upstanding arm, said float means including a float, a float rod carried by said float, said float rod extending through an opening in the master brake cylinder filler cap in sliding relation thereto, said float rod having an arm at its upper end for engaging the arm of said band, said opening and said float rod being polygonal in cross-section whereby said arm carried by the float rod is maintained in alignment with said fixed contact.

2. A float operated switch for indicating the oil level in a master brake cylinder, said switch including a movable contact carried by a float intended to be mounted within a master brake cylinder, and a fixed contact, said fixed contact being in the form of a clamping band having spaced ends urged together by a fastener, said band being provided with insulation and being adapted to be clamped about a master brake cylinder in insulated relation thereto, one of said ends forming an upstanding arm engageable by said movable contact to complete an electrical circuit.

References Cited in the file of this patent

UNITED STATES PATENTS

| Number | Name | Date |
|---|---|---|
| 768,939 | Hall | Aug. 30, 1904 |
| 1,051,245 | Marchal | Jan. 21, 1913 |
| 1,085,964 | Briggs | Feb. 3, 1914 |
| 1,374,635 | Cleveland et al. | Apr. 12, 1921 |
| 1,395,095 | Cureton | Oct. 25, 1921 |
| 1,712,932 | Mulvany | May 14, 1929 |
| 2,494,802 | Fox | Jan. 17, 1950 |
| 2,520,237 | Cleary | Aug. 29, 1950 |

FOREIGN PATENTS

| Number | Country | Date |
|---|---|---|
| 465,857 | Germany | Sept. 26, 1928 |